(12) United States Patent
Reifer et al.

(10) Patent No.: US 8,931,372 B2
(45) Date of Patent: Jan. 13, 2015

(54) COAXIAL DOUBLE DRIVE ASSEMBLY APPLICABLE WITH SHIELDING ELEMENTS OF A SECONDARY SKIN FACADE OF A BUILDING

(75) Inventors: Michael Reifer, Vahrn (IT); Dietmar Telfser, Schlanders (IT); Josef Hilpold, Brixen (IT)

(73) Assignee: Frener & Reifer GmbH/Srl, Brixen/Bressanone (IT)

( * ) Notice: Subject to any disclaimer, the term of this patent is extended or adjusted under 35 U.S.C. 154(b) by 595 days.

(21) Appl. No.: 13/318,331

(22) PCT Filed: Apr. 21, 2010

(86) PCT No.: PCT/EP2010/055233
§ 371 (c)(1),
(2), (4) Date: Jan. 17, 2012

(87) PCT Pub. No.: WO2010/124970
PCT Pub. Date: Nov. 4, 2010

(65) Prior Publication Data
US 2012/0118101 A1    May 17, 2012

(30) Foreign Application Priority Data

Apr. 30, 2009    (EP) ..................................... 09159175

(51) Int. Cl.
*E06B 7/092*    (2006.01)
*F16H 37/06*    (2006.01)

(52) U.S. Cl.
CPC .............. *E06B 7/092* (2013.01); *F16H 37/065* (2013.01)
USPC ......... 74/665 K; 74/665 A; 49/74.1; 49/82.1; 160/168.1 P; 160/176.1 P

(58) Field of Classification Search
CPC .................. F16H 37/65; F16H 63/067; F16H 2007/0874; F16H 59/042; F16H 59/10; F16H 1/22; F16H 2025/2043; F16H 2025/2075; F16H 2025/209; E06B 7/092
USPC ... 74/665 A, 665 F, 665 G, 665 GA, 665 GB, 74/665 GD, 665 GE, 665 S, 665 K, 665 L, 74/665 M, 665 P, 724, 606 R, 89, 89.13, 74/89.14, 89.16; 310/83, 99; 49/74.1, 49/82.1, 87.1; 160/168.1 P, 178.1 R, 218, 160/220, 206, 210, 215, 309, 310, 911, 913, 160/DIG. 17; 16/384, 288, 359, 354, 348
See application file for complete search history.

(56) References Cited

U.S. PATENT DOCUMENTS 1,504,212 A * 8/1924 Carlson .......................... 351/153
1,594,643 A * 8/1926 Stuart ............................. 160/68

(Continued)

FOREIGN PATENT DOCUMENTS

DE    41 25 692 C1    1/1993
WO    WO 2010/124970 A3    11/2010

*Primary Examiner* — William Kelleher
*Assistant Examiner* — Valentin Craciun
(74) *Attorney, Agent, or Firm* — Amy Allen Hinson; Nexsen Pruet, LLC

(57) ABSTRACT

A coaxial double drive assembly configured for actuating shielding elements of a secondary skin facade of a building is disclosed. The assembly includes an outer drive output and an inner drive output, which are arranged substantially coaxially with each other to an axis of rotation. The assembly also includes a driving arrangement, which is adapted to accept one or more transmission gear assemblies, which connect the outer and inner drive output to one or more rotating motor drives, which axes of rotation are substantially perpendicular to the axis of rotation of the outer and inner drive outputs. The outer drive output and the inner drive output extend at the same side of the coaxial double drive assembly and are adapted to accept a two-part pivot assembly, which when pivoted by the outer drive output and the inner drive output, is adapted for actuating the shielding elements of the secondary skin facade coupled thereto.

17 Claims, 8 Drawing Sheets

(56) References Cited

U.S. PATENT DOCUMENTS

| | | | | |
|---|---|---|---|---|
| 1,688,776 A | * | 10/1928 | Barber | 160/65 |
| 1,978,152 A | * | 10/1934 | Ward | 160/171 |
| 2,087,254 A | * | 7/1937 | Herold | 248/574 |
| 2,166,441 A | * | 7/1939 | Jones | 49/82.1 |
| 2,272,722 A | * | 2/1942 | Morin | 49/82.1 |
| 2,857,634 A | * | 10/1958 | Garbade et al. | 49/77.1 |
| 3,367,210 A | * | 2/1968 | Scott | 74/665 K |
| 4,369,387 A | * | 1/1983 | Haar et al. | 310/83 |
| 4,615,230 A | * | 10/1986 | Guichard | 74/427 |
| 4,761,114 A | * | 8/1988 | Barland | 414/735 |
| 5,058,236 A | * | 10/1991 | Henson | 16/222 |
| 5,791,015 A | * | 8/1998 | Wandinger | 16/228 |
| 6,028,384 A | * | 2/2000 | Billman et al. | 310/83 |
| 6,050,686 A | * | 4/2000 | De Rossi | 351/153 |
| 2002/0174961 A1 | * | 11/2002 | Anderson et al. | 160/178.1 R |
| 2008/0236311 A1 | * | 10/2008 | Kanayama | 74/89.13 |
| 2011/0283824 A1 | * | 11/2011 | Kumlin | 74/89.24 |
| 2013/0340951 A1 | * | 12/2013 | Yu et al. | 160/168.1 P |

* cited by examiner

Fig. 1b
Fig. 1a
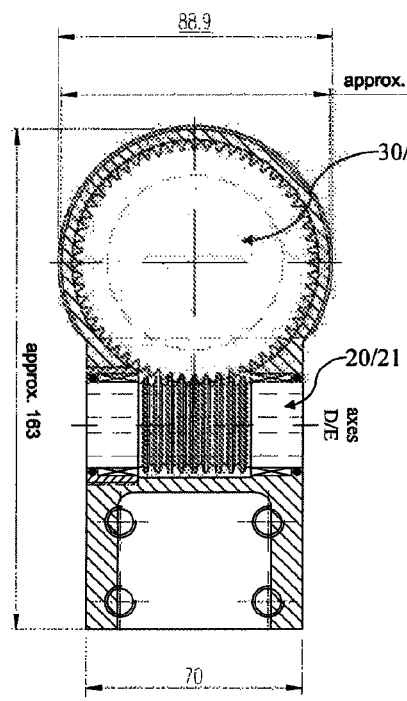
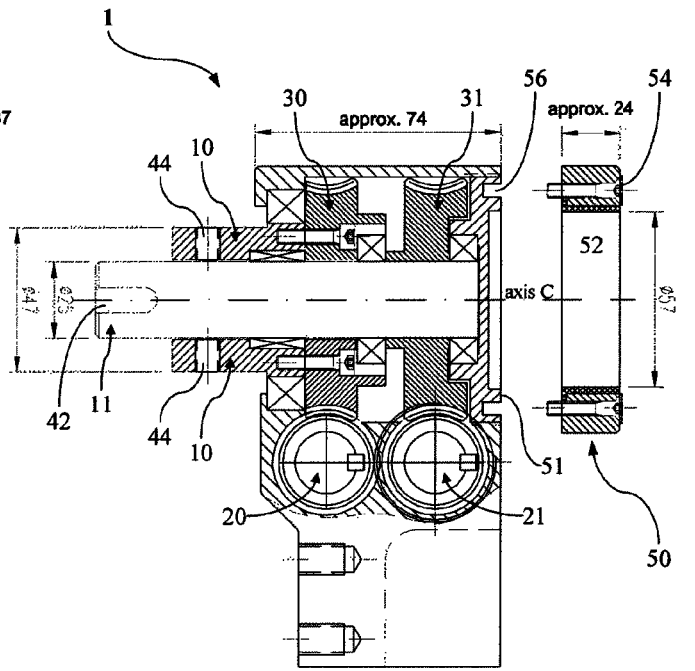
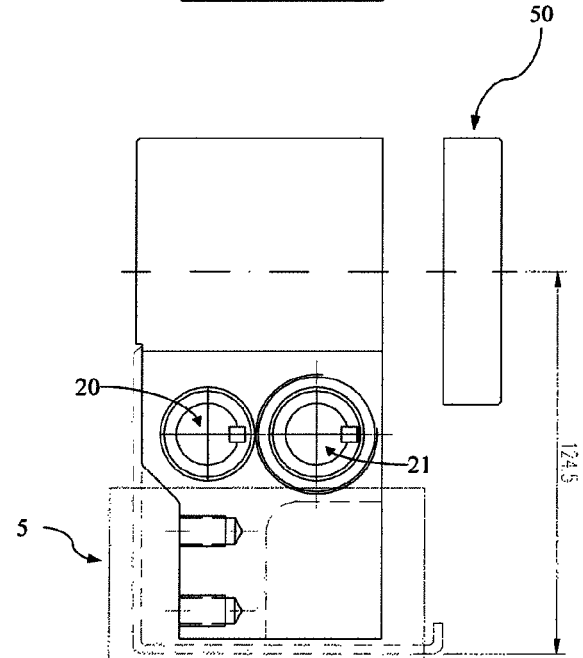
Fig. 1c
Figs. 1

COAXIAL DOUBLE DRIVE ASSEMBLY APPLICABLE WITH SHIELDING ELEMENTS OF A SECONDARY SKIN FACADE OF A BUILDING

CROSS REFERENCE TO RELATED APPLICATION

This application claims priority to PCT/EP2010/055233 filed Apr. 21, 2010 and European Patent Application No. 09159175.0 filed Apr. 30, 2009.

FIELD OF THE INVENTION

The present invention relates to a double drive assembly and in particular a double drive assembly for driving shielding elements of a secondary skin facade of a building. The present invention also relates to a drive system comprising a double drive assembly driven by a detachably mounted transmission gear assembly and arrangements comprising several double drive assemblies.

BRIEF SUMMARY OF THE INVENTION

It is an object of the present invention to provide a double drive assembly, which is in particular applicable for driving sun shielding elements of a secondary front of a building.

According to an aspect of the present invention, a coaxial double drive assembly configured for actuating shielding elements of a secondary skin facade is provided. The coaxial double drive assembly comprises an outer drive output and an inner drive output, which are arranged coaxially with each other to an axis of rotation. The coaxial double drive assembly further comprises driving arrangement, which is adapted to accept one or more transmission gear assemblies. The transmission gear assemblies connect the outer and inner drive outputs to one or more rotating motor drives. The axes of rotation of the rotating motor drives are substantially perpendicular to the axis of rotation of the outer and inner drive outputs. The outer drive output and the inner drive output extend at the same side of the coaxial double drive assembly and are adapted to accept a two-part pivot assembly, which when pivoted by the outer drive output and the inner drive output, is adapted for orienting sun shielding elements of the secondary skin facade coupled thereto.

According to an embodiment of the present invention, the coaxial double drive assembly further comprises a first gear wheel connected to the outer drive output and a second gear wheel connected to the inner drive output. The first and second gear wheels pivot about the axis of rotation. The coaxial double drive assembly further comprises a first worm pinion engaged with the first gear wheel and a second worm pinion engaged with the second gear wheel.

According to an embodiment of the present invention, the coaxial double drive assembly further comprises a ring guide (50), which accepts the two-part pivot assembly and which allows to two-part pivot assembly to pivot therein. The ring guide (50) is detachably mounted at the opposite side with respect to the side at which the outer drive output and the inner drive output extend. The ring guide allows setting up a string assembly of two or more coaxial double drive assemblies. The two-part pivot assembly coupled to one of the coaxial double drive assemblies of the string assembly is accepted by the ring guide of the next coaxial double drive assembly of the string assembly.

According to an embodiment of the present invention, the surface (51) of the coaxial double drive assembly, at which the ring guide is detachably mounted, is substantially perpendicular to the axis of rotation.

According to an embodiment of the present invention, the two-part pivot assembly comprises an outer hollow shell element and an inner core element. The outer hollow shell element comprises recesses, through which mount elements, which are adapted to carry the sun shielding elements, are passed through. The mount elements are coupled to the inner core element coaxially arranged within the outer hollow shell element.

According to an embodiment of the present invention, the coaxial double drive assembly is mountable to a surface by a coaxial double drive mounting, to which the coaxial double drive assembly is detachably mounted.

According to an embodiment of the present invention, axes of rotation of the first and second worm pinions are substantially parallel to each other and substantially perpendicular to the axis of rotation.

According to an embodiment of the present invention, the coaxial double drive assembly is drivable by a transmission gear assembly, which is connectable with a rotating motor drive and which engages with at least one of the first and second worm pinion, when mounted to the coaxial double drive assembly. The transmission gear assembly is detachably mountable to the coaxial double drive assembly.

According to an embodiment of the present invention, the first worm pinion and the second worm pinion are connectable with driving rods, which are adapted for interconnecting the first worm pinions of a drive interconnecting arrangement comprising two or more coaxial double drive assemblies and which are adapted for interconnecting the second worm pinions of the drive interconnecting arrangement.

According to an embodiment of the present invention, the drive interconnecting arrangement comprises a first transmission gear assembly connectable with a first rotating motor drive. The first transmission gear assembly mounted one of the coaxial double drive assemblies of the drive interconnecting arrangement interconnects the first motor drive with the first worm pinion. The drive interconnecting arrangement comprises a second transmission gear assembly connectable with a second rotating motor drive. The second transmission gear assembly mounted one of the coaxial double drive assemblies of the drive interconnecting arrangement interconnects the second motor drive with the second worm pinion.

According to an embodiment of the present invention, the driving rod comprises two rod portions and a connecting element, which is adapted to interconnect the two rod parts of the driving rod.

According to an embodiment of the present invention, the connecting element is adapted to accept at least a part of at least one of the two rod portions to allow for length adaptation of the driving rod.

According to an embodiment of the present invention, the driving rod is slid through the first worm pinion or the second worm pinion, which is provided with a lead-through.

BRIEF DESCRIPTION OF THE DRAWINGS

The drive assembly according to the present invention will now be described, by way of example, with reference to the drawings, in which:

FIGS. 1a-1c show engineering drawings comprising different views of a coaxial double drive assembly according to an embodiment of the present invention;

DETAILED DESCRIPTION OF THE INVENTION

Figure 2:
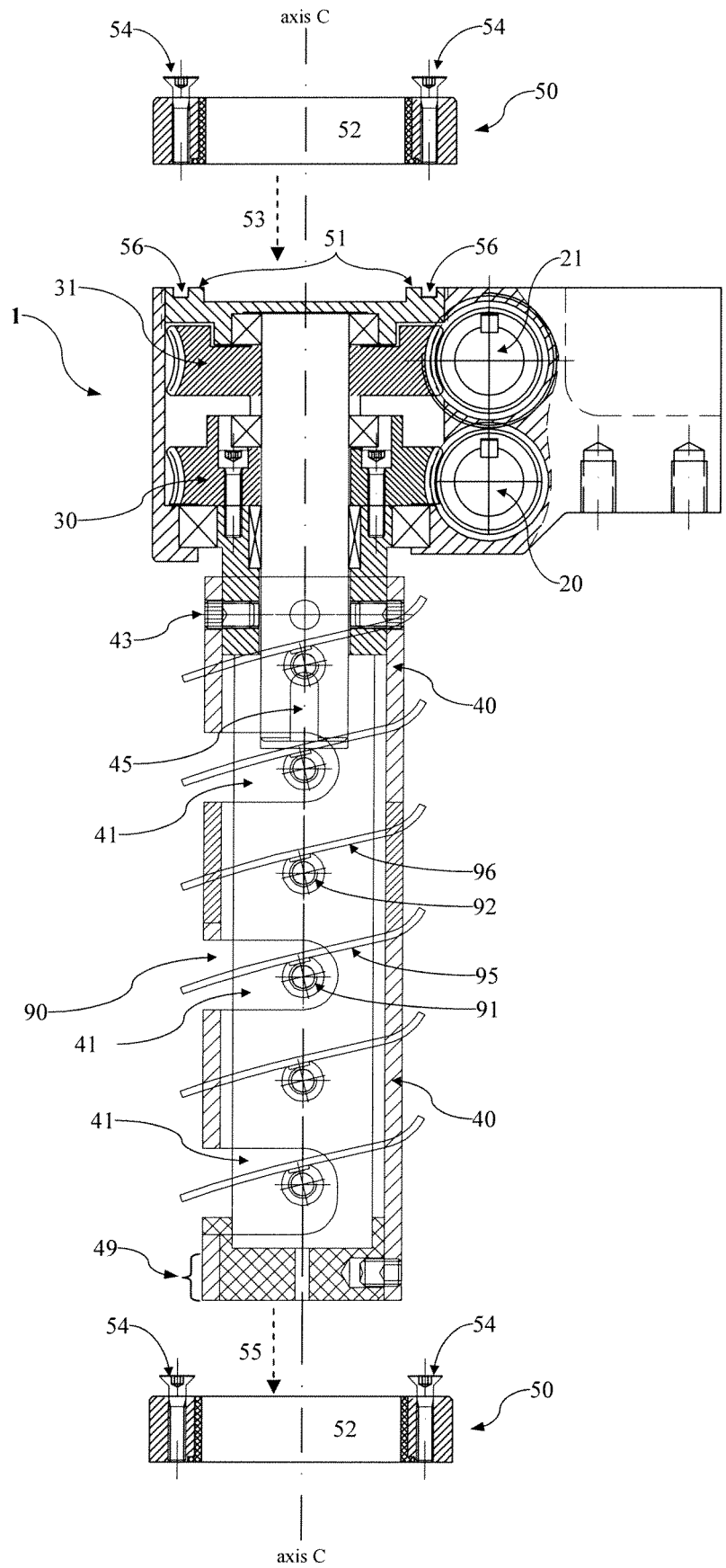
FIG. 2 shows an engineering drawing of the coaxial double drive assembly with coupled external shaft according to an embodiment of the present invention.

It should be understood that same numerals throughout the different figures relate to same or at least similar components.

According to an embodiment of the present invention, a coaxial double drive assembly 1 is provided, which is capable for driving independently an outer drive output 10 and an inner drive output 11, which are arranged substantially coaxially with each other to a common axis of rotation or a substantially parallel aligned axes of rotation. This is the inner drive output 11 is arranged coaxially within the outer drive output 10 and the rotational axes of the outer drive output 10 and the inner drive output 11 are substantially congruent with each other are at least close to each other and substantially parallel to each other.

It should be noted that the outer drive output 10 has a tubular shape, which is one possible example of the outer drive output 10. However, the present invention should not be understood as being limited to a tubular shaped outer drive output but may have different shapes such as elliptic, hexagonal or any other non-circular shapes in cross section. It should be noted that the inner drive output 11 has a rod-like shape, which is one example of an inner drive output 11. However, the present invention should not be understood as being limited to a rod-like shape but may have different shapes such as elliptic, hexagonal or any other non-circular shapes in cross section view. The outer drive output 10 and the coaxially arranged inner drive output 11 within the outer drive output 10 are principally designed to allow free rotation or pivoting with respect to each other.

Throughout the following drawings, the outer drive output 10 is illustrated as a tubular shaped drive output whereas the inner drive output 11 is illustrated as a rod-like or shaft-like drive output for the sake of illustration of the present invention.

The outer drive output 10 and the inner drive output 11 coaxially arranged with each other is adapted to accept a two-part pivot assembly, which has an shell part in respect of which a core part is disposed within the shell part. The shell part and the core part are arranged coaxially arranged with each other as determined by the outer drive output 10 and the inner drive output 11 accepting the two-part pivot assembly. The two-part pivot assembly has a preferred orientation congruent with the axis of rotation of the outer drive output 10 and the inner drive output 11 about which preferred orientation the shell part and the core part are allowed rotating independently. In the following, the parts of the two-part pivot assembly are embodied as hollow shell element 40 and inner core element 41 corresponding to the outer drive output 10 and the inner drive output 11 and each accepted thereby.

FIG. 1 shows different engineering drawing views of the coaxial double drive assembly 1 according to the first embodiment of the present invention.

In particular, FIG. 1a shows schematically a section view of the coaxial double drive assembly 1 in accordance with a center plane parallel to a common axis of rotation C of the outer drive output 10 and the inner drive output 11, respectively. FIG. 1b shows schematically a section view of the coaxial double drive assembly 1 in accordance with a plane substantially perpendicular to the axis of rotation C. FIG. 1c shows schematically a front view of the coaxial double drive assembly 1 in accordance with a plane parallel to the axis of rotation C.

The outer drive output 10 is adapted to accept a hollow shell element 40 and the inner drive output 11 is adapted to accept an inner core element 41. The inner core element 41 is coaxially arranged within the hollow shell element 40 to the common axis of rotation C.

The outer hollow shell element 40 may further have one or more slits or slit-like recesses. These one or more slits or slit-like recesses are provided along the longitudinal extent of the outer hollow shell element 40 and preferably extend in direction of circumference of the outer hollow shell element 40. The one or more slits or slit-like recesses allow for coupling mounting elements such as arms to the inner core element 41 and the extent of the slit-like recesses in direction of circumference define the pivoting range of the inner core element 41 in relationship to the outer hollow shell element 40. It should be noted that the term "coupling" should be generally understood as detachably coupling for instance by a detachable joint connection as well as fixedly attached for instance by welding and the like.

The outer hollow shell element 40 may be a tubular shaft element and the inner core element 41 may be a hollow or preferably solid inner shaft such as shown throughout the drawings for the sake of illustration.

The outer hollow shell element 40 and the inner core element 41 are disposed coaxially and both elements 40 and 41 are detachably accepted the outputs 10 and 11 and extend outwardly from the coaxial double drive assembly 1 through the same side thereof. The outer hollow shell element 40 and/or the inner core element 41 may substantially have a circular shape in cross section. However, it should be understood that the present invention is not limited thereto but have any other shapes in cross section including for instance elliptic, hexagonal shape or any other non-circular shape. It should be noted that the outer hollow shell element 40 and the coaxially arranged inner core element 41 within the outer hollow shell element 40 are principally designed to allow free rotation or pivoting with respect to each other.

Although the inner drive output 11 and the outer drive output 10 are illustrated and described to be arranged substantially coaxially to each other and to have a common axis of rotation C, it should be understood that the invention is not limited thereto. The inner drive output 11 and the outer drive output 10 may be also arranged substantially coaxially to each other and may each have an individual axis of rotation. These individual axes should be aligned substantially parallel to each other and preferably close to each other. Accordingly, the outer hollow shell element 40 and inner core element 41 are illustrated and described to be arranged substantially coaxially to each other and to have a common axis of rotation, which is preferably the common axis of rotation C. It should be understood that the invention is also not limited thereto. The outer hollow shell element 40 and the inner core element 41 coaxially arranged within the outer hollow shell element 40 may each have an individual axis of rotation. These individual axes should be aligned substantially parallel to each other and preferably close to each other. Preferably the axes of rotation of the outer hollow shell element 40 and the inner core element 41 may be substantially congruent with the respective individual axes of rotation of the outer drive output 10 and the inner drive output 11.

In the following, the coaxial double drive assembly 1 will be exemplified and detailed as a coaxial double worm drive assembly, which is to be understood as a non-limiting embodiment of the present invention. In particular, the double worm mesh or worm drive arrangement described below exemplifies and details a specific non-limiting embodiment of a driving arrangement, which is provided to allow for actuating or driving the outer and inner drive outputs 10 and 11.

The coaxial double drive assembly 1 comprises a first worm pinion 20 and a second worm pinion 21. The first worm pinion 20 engages with a first worm gear 30 and the second worm pinion 21 engages with a second worm gear 31. The first and second worm pinions 20 and 21 as well as the first and second worm gears 30 and 31 may have a cylindrical outline shape with respect their respective axes of rotation.

The first worm gears 30 is connected with the outer drive output 10, which means that by rotating the first worm pinion 20, the outer drive output 10 pivots and rotates, respectively. The second worm gears 31 is connected with the inner drive output 11, which means that upon rotating the second worm pinion 21, the inner drive output 11 pivots and rotates, respectively.

The first worm gear 30 and the second worm gear 31 are arranged parallel to each other with respect to their plane of rotation and are aligned with respect to the axis of rotation C. According to the embodiment illustrated in FIG. 1, the first worm gear 30 is mounted on the inner drive output 11 embodied as a solid shaft extending within the coaxial double drive assembly 1. The second worm gear 31 is detachably mounted to the outer drive output 10 by with the help of mounting means such as bolts or screws. The outer drive output 10 is embodied as a hollow cylinder element, which encompasses the inner drive output 11 embodied as a solid shaft.

A worm pinion 20 or 21 engaging with a worm gear 30 and 31, respectively, forms a gear assembly which is also called worm mesh or worm drive, which allows for high velocity rations and high load capacity, wherein the latter is associated with the line contact in contrasts to the point contact of for instance crossed-helical meshes. This means that worm drives substantially decreases the speed and increases torque, which is for instance used when driving the worm with electric motors having a substantial high rotation speed and comparatively low torque. The worm pinion is also called worm and has the shape of a screw or screw shaft, whereas the worm gear is also called worm wheel.

The above described embodiment of a driving arrangement on the basis of a double worm mesh or worm drive arrangement is to be understood as not limiting the present invention. Alternatively, the driving arrangement may be realized by a rack drive, a rack-and-pinion drive, belt drive or belt transmission, chain drive or the like, also.

The mechanical loads, in particular mechanical torques, which act on the shielding elements drivable by the coaxial double drive assembly 1, have a retroactive effect on the coaxial double drive assembly 1. The driving axes driven by rotating motor drives are arranged substantially perpendicular to the axis of rotation (C), to which the outer drive output (10) and the inner drive output (11) are arranged substantially coaxially. As a result thereof, self-locking properties of the coaxial double drive assembly with regard to mechanical loads on the shielding elements are obtained. This means that a mechanical load engaging the shielding elements does not result in a rotation of the outer and inner drive outputs 10, 11.

This right-angle arrangement of the one or more motor-driven axes and the axis of rotation of the coaxially arranged drive shafts neither is described in D1 nor represents an advantageous improvement of a driving assembly driving pumps for artificial blood circulation since pumps does not exert any analogous retroactive effect on the coaxial double drive assembly 1.

As will be understood more fully when reading the description below, in particular the description referring to FIG. 3, a non-limiting main aspect of the present invention is the string arrangement of several coaxial double drive assemblies and the improved removability of an individual coaxial double drive assembly from the string arrangement. In order to ensure the improved removability of an individual coaxial double drive assembly, the transmission gear assembly, which transfers the rotational actuations of driving motors to rotation or pivoting of the outer and inner drive output 10, 11, has to be detachably mountable on the lateral side of the coaxial double drive assembly, wherein on the lateral side of the coaxial double drive assembly is to be understood with respect to the sides at which the outer and inner drive outputs 10, 11 are arranged, which side may be designated front side, and the side at which the guide ring 50 is arranged, which side may be designated back side. This means that the transmission gear assembly is arranged with respect to the coaxial double drive assembly to engage therewith substantially perpendicular to the axis/axes of rotation of the outer and inner drive outputs 10, 11.

FIG. 1b shows a view of a central section of the worm mesh or worm gear assembly taken through the worm pinion's (or worm's) axis and perpendicular to the worm's gear (or worm wheel's) axis. The mating worm gear teeth have a helical lead, which worm gear teeth engage with the screw groove of the worm. Unlike ordinary gear trains, the direction of transmission (input shaft vs. output shaft) is typically not reversible due to greater friction involved between the worm pinion and worm gear, when for instance a one spiral worm is used. This means that substantially any possibility is eliminated that the output drives the input. In case of a worm with multiple spirals driving ratios reduces accordingly and the braking effect of the worm and the worm gear may need to be discounted as the worm gear may be able to drive the worm pinion.

The worm gear configuration, in which the worm gear cannot drive the worm are called to be self-locking. It should be noted that self-locking does not occur in all (one spiral) worm meshes since it requires special conditions. The governing conditions are the lead angle of the worm pinion and the coefficient of friction between worm pinion and worm gear.

As aforementioned the axes of rotation of the first worm gear 30 and the second worm gear 31 are congruent with the axis of rotation C of the outer drive output 10 and the inner drive output 11. The center axes D/E of the first worm pinion 20 and the second worm pinion 21 are parallel to each other and substantially perpendicular to the axis of rotation C.

The outer drive output 10 and the outer hollow shell element 40 may be detachably connected with the help of detachable mounting means such as bolts 43 or screws, which are accepted by corresponding holes and acceptances 44 illustrates in the hollow cylinder element embodying the outer drive output 10. The inner drive output 11 and the inner core element 41 may be detachably connected with the help of a tongue and groove joint 45, in particular a feather key groove joint. The inner drive output 11 may be provided with a groove element 42 illustrates in the shaft element embodying the inner drive output 11. The groove element 42 is provided to engage with a tongue element arranged at the outer surface of the inner core element 41.

The coaxial double drive assembly 1 further comprises a guide ring 50, which is detachably mounted at the coaxial double drive assembly 1, in particular at a casing surface 51 of coaxial double drive assembly 1, which casing surface 51 is opposite to the casing outlet, through which the outer drive output 10 and the inner drive output 11 extend, as well as from, which the outer hollow shell element 40 and the inner core element 41 extend.

The casing surface 51 is substantially perpendicular to the axis of rotation C and the interior of the guide ring 50 is preferably designed to accept an outer hollow shell element 40 coupled with another next coaxial double drive assembly or to accept an inner core element 41 coupled with another next double drive assembly. The guide ring 50 is detachably mounted with the help of detachable mounting means 54 such as bolts or screws, which are accepted by corresponding holes or acceptances 56 provided in the casing surface 51 of the coaxial double drive assembly 1.

The coaxial double drive assembly 1 is mountable with the help of a separate coaxial double drive mounting 5, which may be a casing element or a tube element. The coaxial double drive mounting 5 in particular enables mounting the coaxial double drive assembly at a surface, in particular an outside surface or front of a building. The coaxial double drive assembly 1 and the coaxial double drive mounting 5 are detachable mounted at each other with the help of detachable mounting means 6 such as bolts or screws.

FIG. 2 illustrates the coaxial double drive assembly 1 with the external outer hollow shell element 40 and external inner core element 41 coupled to the respective outer drive output 10 and inner drive output 11 as described above. The coaxial double drive assembly 1 is designed for enabling pivoting the external outer hollow shell element 40 and external inner core element 41. The pivoting range may be approximately 130°±10°. The pivoting angle step width may be approximately 5°. Moreover, the gear reduction of the coaxial double drive assembly 1 may be approximately 60 or more. Depending on the individual direction of rotation of the worm pinions 20 and 21, the external outer hollow shell element 40 and external inner core element 41 may be pivoted in the same direction of rotation or may be pivoted in opposite directions of rotation.

As aforementioned, the external inner core element 41 and in particular, the external outer hollow shell element 40 may have a shape different from a circular shape in cross section. The guide ring 50 is provided to be slid onto for instance an outer hollow shell element 40. In order to allow pivoting the outer hollow shell element 40 about the axis of rotation C and in order to ensure guidance of the outer hollow shell element 40 by the guide ring 50, into which the outer hollow shell element 40 is inserted (reference sign 55 indicates the direction of insertion) the guide ring 50 has preferably an interior 52 with a circular shape in cross section and at least an end portion 49 of the external outer hollow shell element 40, which end portion 49 thereof is inserted therein, should have a corresponding circumferential circular shape in cross section. The matching shapes of the end portion 49 and the interior 52 of the guide ring 50 allows for sliding of the adjoining surfaces thereof against each other when the external outer hollow shell element 40 is pivoted with the help of the coaxial double drive assembly 1 driving the external outer hollow shell element 40 by the outer drive output 10 thereof. It is immediately understood that analogous considerations applies in case the inner core element 41 is to be inserted into the guide ring 50 instead of the outer hollow shell element 40.

Figure 3A:
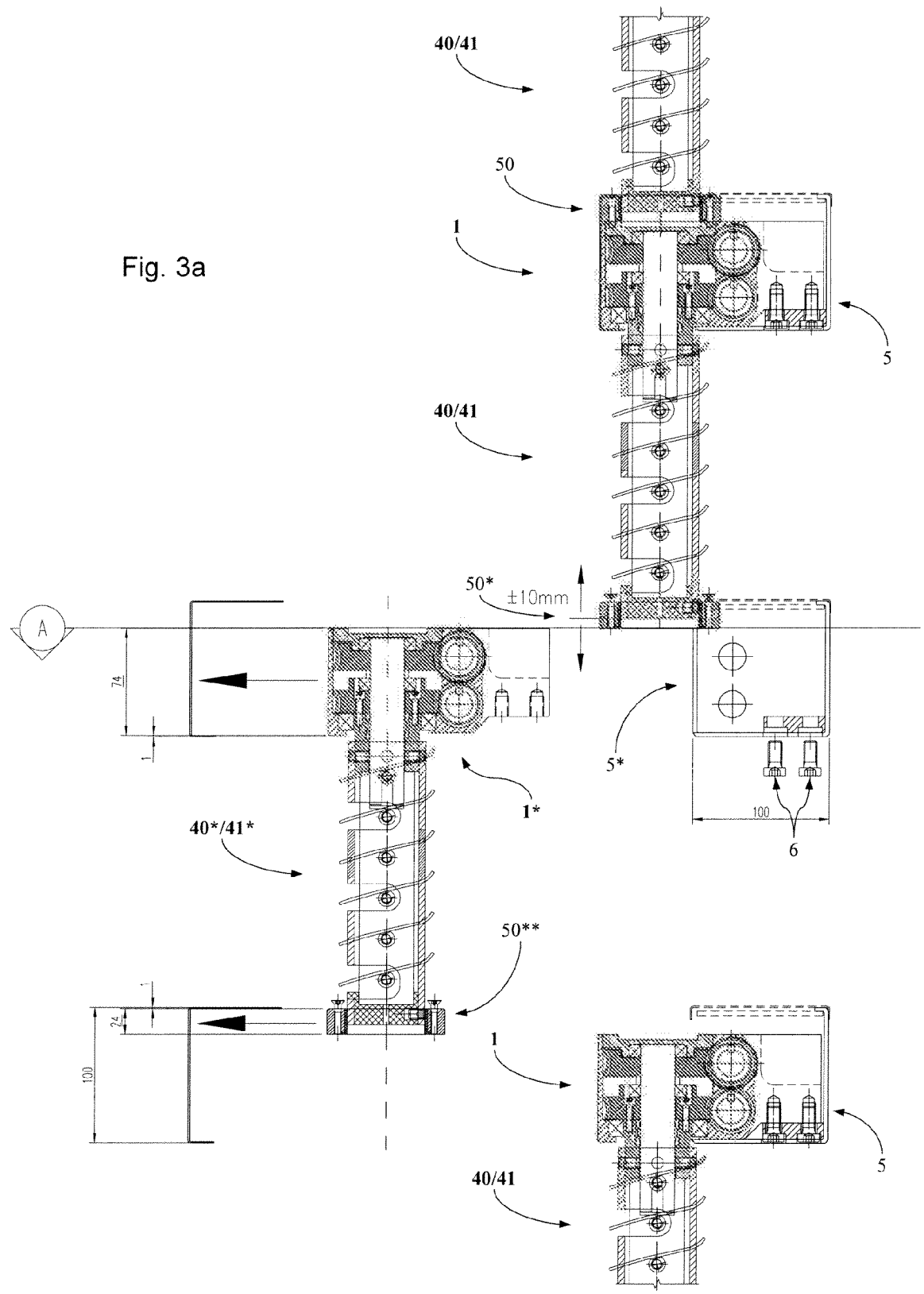
FIGS. 3a-3c show engineering drawings comprising different views of a string arrangement of coaxial double drive assemblies according to an embodiment of the present invention.
Figure 3B:
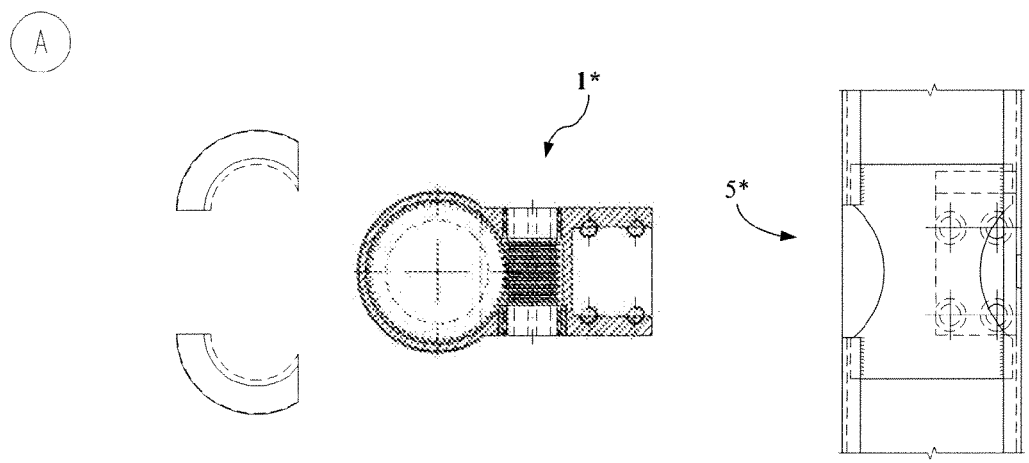

As indicated in FIG. 2, the coaxial double drive assembly 1 is designed such that several coaxial double drive assemblies 1 can be stringed together forming a string or train arrangement comprising several coaxial double drive assemblies. The stringing together can be more fully understood with reference to FIG. 3a, which illustrates such a string arrangement of several coaxial double drive assemblies 1, and which schematically indicates in which way such string arrangement can be assembled and disassembled according to an embodiment of the present invention. For the sake of completeness, FIG. 3b illustrates a view on plane A as indicated in FIG. 3a.

The string arrangement comprising at least two or more coaxial double drive assemblies 1 is aligned along the rotation axis C, about which the first worm gear (worm wheel) 30 and the second worm gear (worm wheel) 31 as well as the outer hollow shell element 40 and inner core element 41 pivot. The guide ring 50 of one of the coaxial double drive assemblies 1 of the string arrangement accepts the outer hollow shell element 40, within which the inner core element 41 is arranged, and is detachably mounted to another next coaxial double drive assembly 1. Thereby, such string arrangement comprising several coaxial double drive assemblies 1 is formed.

Assembly and disassembly of the string arrangement comprising several coaxial double drive assemblies 1 is enabled by the guide rings 50, which are detachably mounted to the coaxial double drive assembly. By removing the mounting means 55, with which the guide ring 50* is mounted to the coaxial double drive assembly 1* and removing the mounting means 55 of the guide ring 50, into which the outer hollow shell element 40*(encompassing the inner core element 41*) of the coaxial double drive assembly 1* extend (i.e. the guide ring 50** of the next the coaxial double drive assembly in direction of the one-sided extending external elements 40 and 41), the coaxial double drive assembly 1* is detached from two next adjacent coaxial double drive assemblies in the string arrangement. Further, the coaxial double drive assembly 1* is detached from the coaxial double drive mounting 5* (by detaching the mounting means 6**, which may be for example blots or screws).

Then, the coaxial double drive assembly 1* can be removed by pulling in a direction substantially perpendicular to the axis of rotation C and substantially parallel to the casing surface 51, respectively.

It is immediately understood that the string arrangement of coaxial double drive assemblies 1 can be assembled in vice versa way. This means that the guide ring 50 is slid onto the external hollow shell element 40* (encompassing the inner core element 41*), which is coupled to the coaxial double drive assembly 1*. Then, the coaxial double drive assembly 1* is pushed into the string arrangement until the axes of rotation C of the coaxial double drive assemblies 1 align with each other. Thereafter, the guide ring 50* and the guide ring 50** are attached to the respective coaxial double drive assembly and the coaxial double drive assembly 1* is attached to the coaxial double drive mounting 5***.

The coaxial double drive assemblies 1 within the string arrangement are spaced apart relative to each other such that the external elements 40 and 41 extend into the guide rings 50 at a predefined penetration depth, which is preferably less than the thickness of the guide rings 50 and eventually plus a depth of a recess in the casing surface 51 of the coaxial double drive assembly 1. In case the casing surface 51 is provided with a recess the shape of the recess in cross section should be congruent with the corresponding shape of the interior 52 of the guide ring 50. Hence, an expansion space remains. Such expansion space may be provided because of manufacturing tolerances, thermal length variations of the coaxial double drive assemblies and the external elements 40 and 41 as well as thermal length variations of the surface, at which the coaxial double drive mountings 5 are mounted (for instance the outside surface of a building).

Figure 3C:
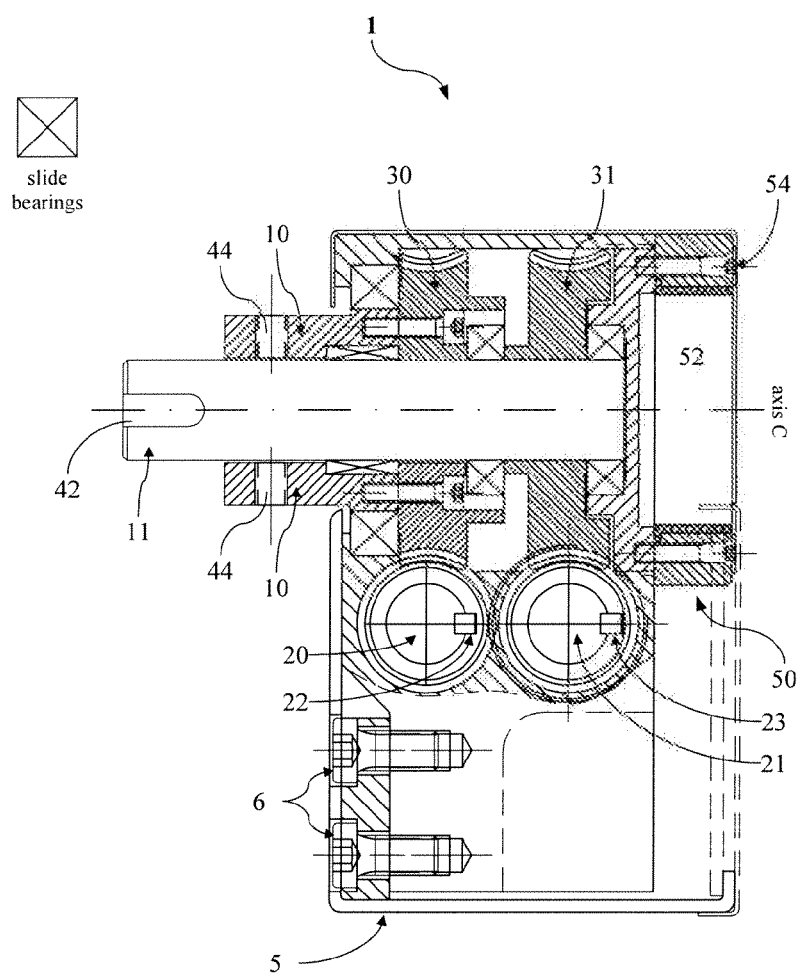

FIG. 3c illustrates a coaxial double drive assembly 1 with the guide ring 50 and the coaxial double drive mounting 5 according to an embodiment of the present invention, which are encased by common housing elements. The first and second worm pinions 20 and 21 may be provided with first and second adjustment indicators 22 and 23. In order to ensure that the external elements 40 and 41 each has a predetermined pivot angle adjustment the position of the first and second adjustment indicators 22 and 23 as well as position of the groove element 42 and the acceptances 44 can be used as indicators. In order to ensure the desired predetermined pivot angle adjustment each of the indicators should be brought into a predefined position or the positions of the aforementioned indicators should be brought into predetermined positional relationships with respect to each other.

The modular concept of the present invention has been already described with reference to the coaxial double drive assembly 1 itself, which can be arranged in a sting arrangement, and the coaxial double drive mounting 5, which is provided as a separate component. The modular concept of the present invention will be further illustrated with reference to the separate transmission gear assemblies 60 and 61, which are provided to drive the first worm pinion (worm) 20 and the second worm pinion (worm) 21 of the coaxial double drive assembly 1.

Figure 4:
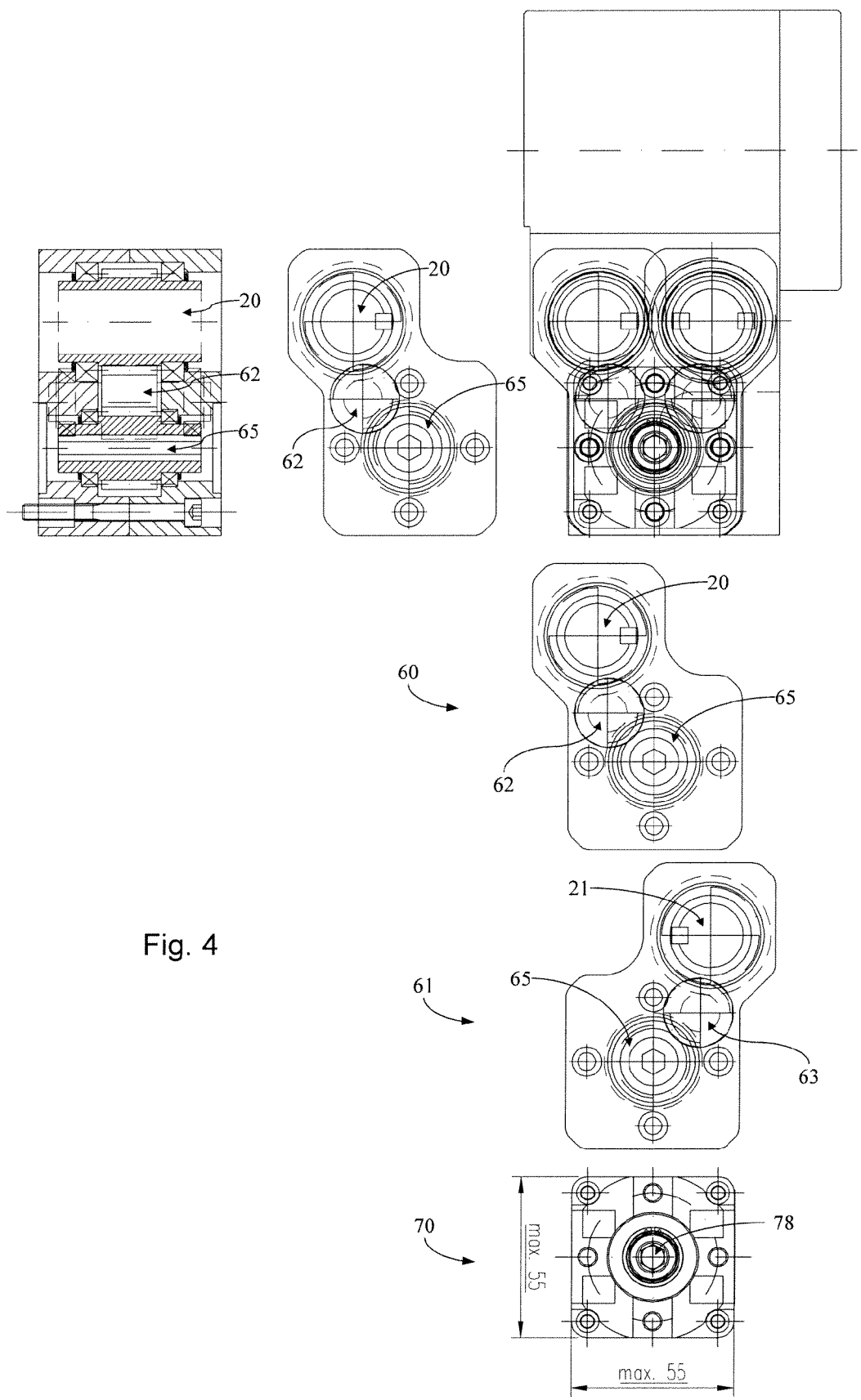
FIG. 4 shows an engineering drawing comprising different views of a transmission assembly according to an embodiment of the present invention.

FIG. 4 illustrates transmission gear assemblies 60 and 61 according to an embodiment of the present invention, which are designed to cooperate with the coaxial double drive assembly 1 according to an embodiment of the present invention. FIG. 4 comprises different views of the transmission gear assemblies 60 and 61.

The embodiment of the transmission gear assembly 60 comprises a transmission worm pinion 62 and a drive worm pinion 65. The transmission worm pinion 62 of the first transmission gear assembly 60 is adapted to engage with the first worm pinion 20 of the coaxial double drive assembly 1. The drive worm pinion 65 of the first transmission gear assembly 60 may be coupled with a boss or axis 78 of an (electric) motor 70 or may integrally formed thereat.

The embodiment of the transmission gear assembly 61 comprises a transmission wheel 63 and a drive worm pinion 65. The transmission worm pinion 63 of the second transmission gear assembly 60 is adapted to engage with the second worm pinion 21 of the coaxial double drive assembly 1. The drive worm pinion 65 of the second transmission gear assembly 61 may be coupled with a boss or axis 78 of a (electric) motor 70 or may be integrally formed thereat.

The transmission gear assemblies 60 and 61 are designed to be detachably mounted to the coaxial double drive assembly 1. When the transmission gear assemblies 60 or 61 are attached to the coaxial double drive assembly 1, pivoting or rotating of the drive worm pinion 65 effect pivoting of the outer drive output 10 and inner drive output 11, respectively, driven by the first and second worm pinions 20 and 21, respectively, engaging the first and second worm gear 30 and 31, respectively. The transmission gear assemblies 60 and 61 may designed as separate components or may be provided as an integrated component implementing both the transmission gear assemblies 60 and 61.

The pivoting or rotation of the drive worm pinion 65 drives indirectly the outer drive output 10 and the inner drive output 11, respectively, in accordance with the overall gear reduction determined by the gear reduction of the coaxial double drive assembly 1 and the gear reduction of the transmission gear assembly 60 and 61, respectively. The gear reduction of the transmission gear assembly 60 and 61 may be approximately 1.5. The overall gear reduction may be approximately 100; however, the overall gear reduction is composed of the gear reduction of the transmission gear assembly 60 and 61, respectively, and the gear reduction of the coaxial double drive assembly 1.

This means in case the transmission gear assembly 60 is mounted with the coaxial double drive assembly 1 the outer drive output 10 can be pivoted with the help of an electric motor 70, which axis/boss 78 is coupled to the drive worm pinion 65. In case the transmission gear assembly 61 is mounted with the coaxial double drive assembly 1 the inner drive output 11 can be pivoted with the help of an electric motor 70, which axis/boss 78 is coupled to the drive worm pinion 65.

As illustrated in FIG. 4, the transmission gear assemblies 60 and 61 such that the electric motor 70 has the same relative mounting position for both transmission gear assemblies 60 and 61. This is achievable in that the transmission worm pinions 62 and 63 are arranged substantially mirror symmetrically with respect to a plane, which is substantially perpendicular to the axis of rotation C (when the transmission gear assemblies 60 and 61 is detachably mounted to the double worm gear assembly 1) and which comprises the axis of rotation of the drive worm pinion 65 and the axis of rotation 78 of the electric motor 70, respectively.

Different gear reductions may be for instance realized by changing one or more gear element properties including diameter (circumference) or lead angle of the (first) transmission worm pinion 62 of the transmission gear assembly 60, the first worm pinion 20 and the first worm gear 30 of the coaxial double drive assembly 1 in relationship to the one or more corresponding gear element properties of the (second) transmission worm pinion 63 of the transmission gear assembly 61, the second worm pinion 21 and the second worm gear 31 of the coaxial double drive assembly 1.

The common drive worm pinion 65 easily allows forming an integral transmission gear assembly including both the aforementioned described transmission gear assembly 60 and transmission gear assembly 61.

The above described embodiment of a transmission gear assembly on the basis of a worm mesh or worm drive arrangement is to be understood as not limiting the present invention. In analogy to the coaxial double drive assembly and the driving arrangement thereof, respectively, the transmission gear assembly may be realized by a rack drive, a rack-and-pinion drive, belt drive or belt transmission, chain drive or the like, also.

As aforementioned, a non-limiting main aspect of the present invention is the string arrangement of several coaxial double drive assemblies and the improved removability of an individual coaxial double drive assembly from the string arrangement. In order to ensure the improved removability of an individual coaxial double drive assembly, the transmission gear assembly, which transfers the rotational actuations of driving motors to rotation or pivoting of the outer and inner drive output 10, 11, has to be detachably mountable on the lateral side of the coaxial double drive assembly. This means that the transmission gear assembly is arranged with respect to the coaxial double drive assembly to engage therewith substantially perpendicular to the axis/axes of rotation of the outer and inner drive outputs 10, 11. In turn, the transmission gear assembly provides one or more drive inputs to be coupled to an electric motor, as outlined above. In order to ensure the above described improved removability of an individual coaxial double drive assembly, the axis/axes of rotation of the driving electric motors should be arranged substantially perpendicular to the axis/axes of rotation of the outer and inner drive output 10, 11 as readily appreciable from for instance the engineering awing of FIG. 4.

Figure 5A:
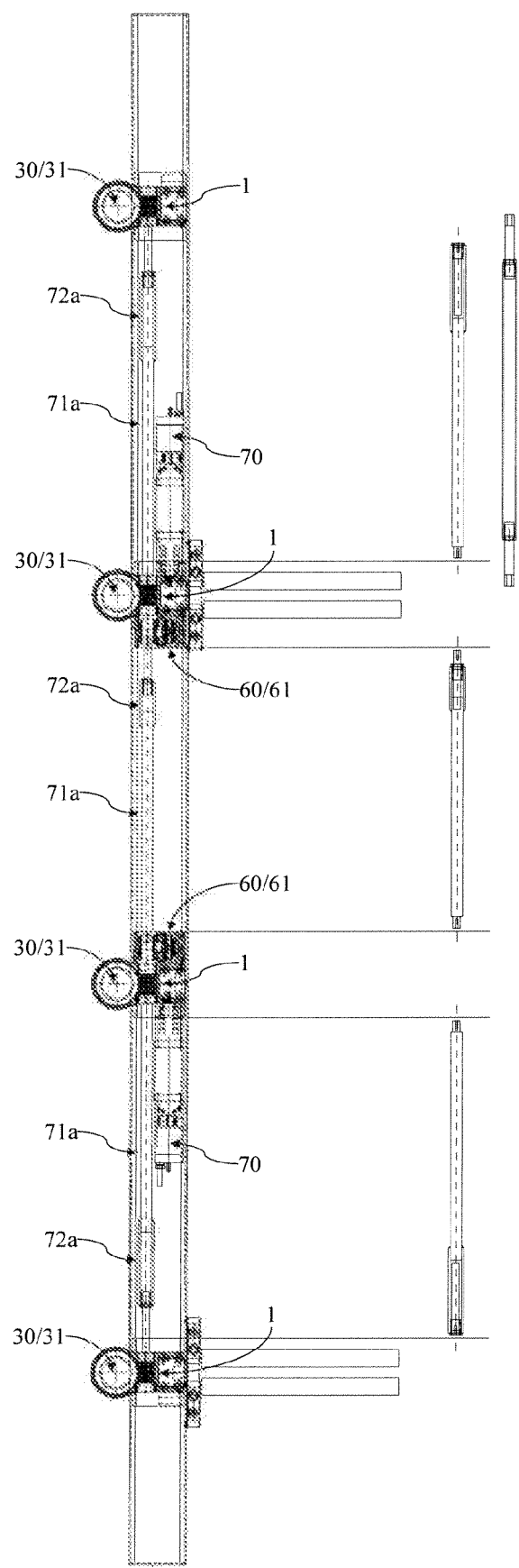
FIGS. 5a-5c show engineering drawings of a driving intercoupling assembly of double coaxial worm assemblies according to embodiment of the present invention.
Figure 5B:
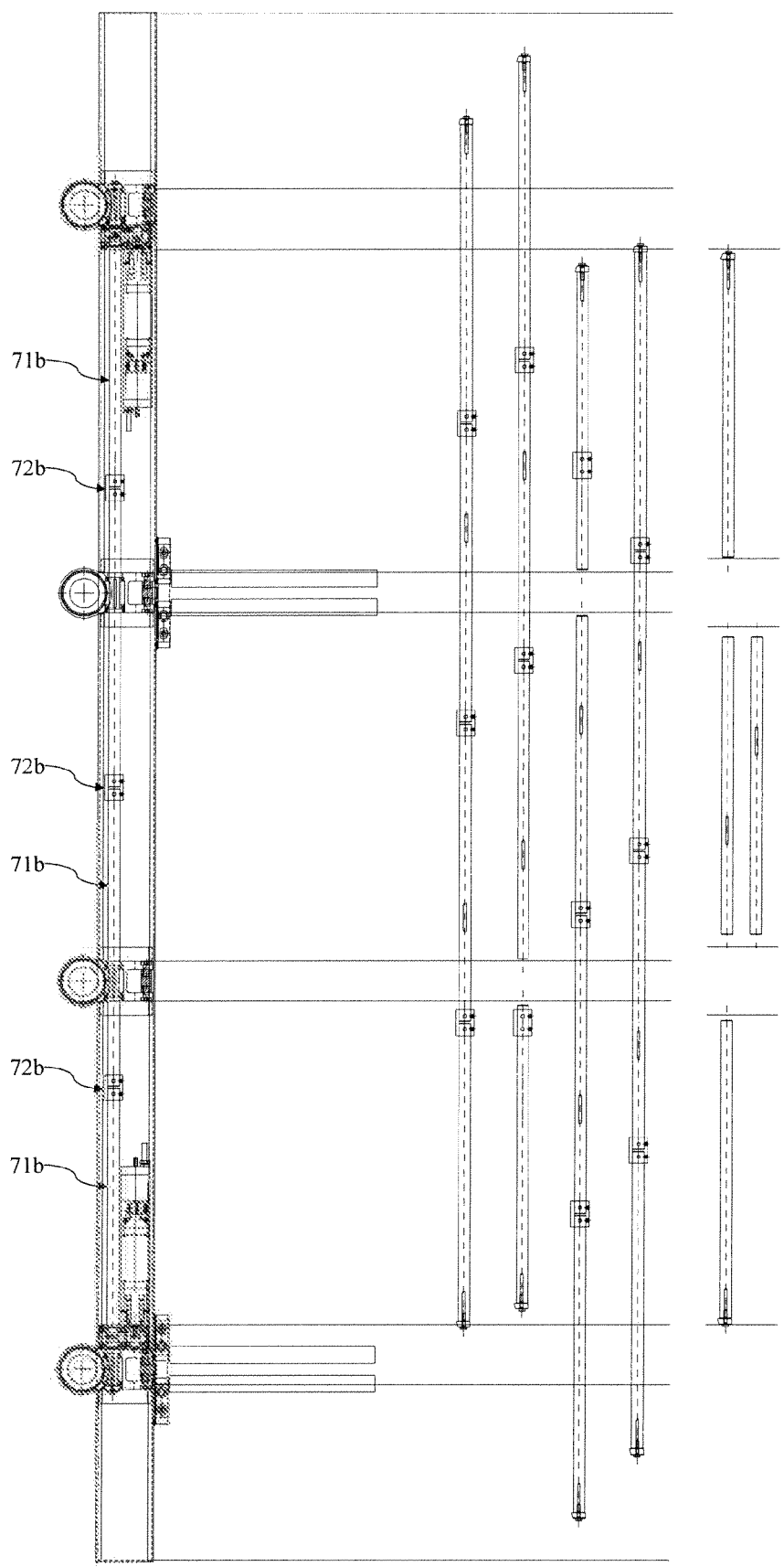
Figure 5C:
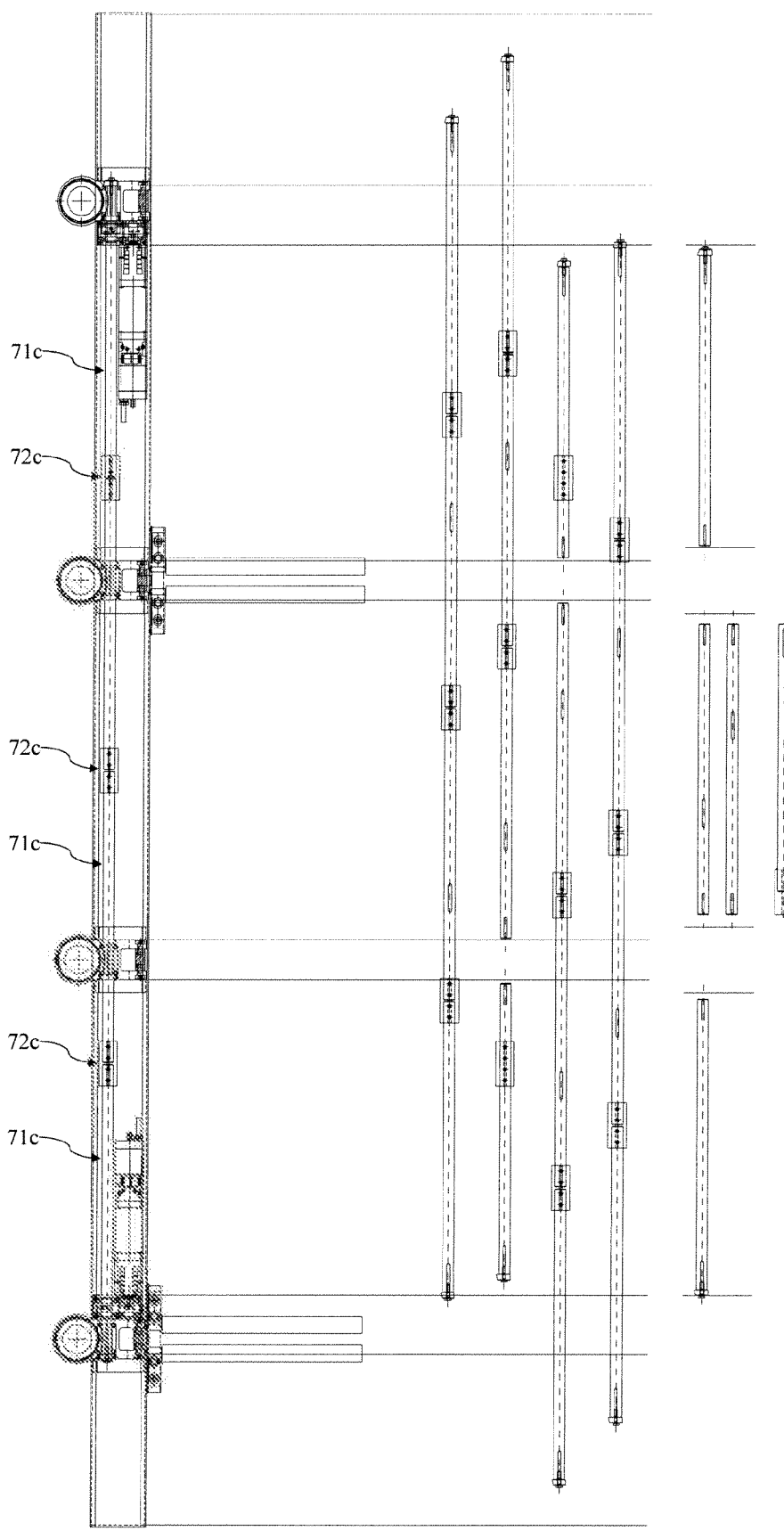

FIGS. 5a to 5c illustrate a drive intercoupling arrangement of four coaxial double drive assemblies 1, which drive sections are intercoupled with the help of driving rods 71. Intercoupled at the drive sections of the coaxial double drive assemblies should be understood in that the first worm pinions 20 of the intercoupled coaxial double drive assemblies are coupled to each other with the help of driving rods 71 and the second worm pinions 21 of the intercoupled coaxial double drive assemblies are coupled to each other with the help of driving rods 71.

Hence, the drive intercoupling arrangement of coaxial double drive assemblies 1 is aligned with respect to the rotation axis (longitudinal axis) of the first worm pinions 20 and the second worm pinions 21 of the intercoupled coaxial double drive assemblies, respectively. As already mentioned, the axes of rotation of the first worm pinion 20 and the second worm pinion 21 of a coaxial double drive assembly 1 should be substantially parallel to each other. Hence, the intercoupling of the first worm pinions 20 and second worm pinions 21 of several coaxial double drive assemblies with the help of rigid driving rods 71 is possible in principle.

It should be noted that the driving rods 71 are merely exemplary. The present invention should not be understood as being limited thereto. The driving rods 71 may have different shapes including for instance tubular shape, elliptical solid or elliptical tube-like shape, hexagonal shape and the like.

The intercoupling of the coaxial double drive assemblies 1 through their drive sections allows for using two transmission gear assemblies (and two electric motors 70) arranged with different coaxial double drive assemblies of the drive intercoupling arrangement to drive the outer drive outputs 10 and the inner drive output 11 of the coaxial double drive assemblies within the intercoupling arrangement.

One of the transmission gear assemblies is a transmission gear assembly 60, which enables driving the outer drive outputs 10 of the coaxial double drive assemblies 1 of the intercoupling arrangement and the other one of the transmission gear assemblies is a transmission gear assembly 61, which enables driving the inner drive outputs 11 of the coaxial double drive assemblies 1 of the intercoupling arrangement.

The number of coaxial double drive assemblies 1 within the intercoupling arrangement is in principle only limited by internal friction. This means that the number of four coaxial double drive assemblies within the drive intercoupling arrangement illustrated in FIG. 5 should be understood as merely exemplarily; hence, the present invention is not limited thereto.

The coaxial double drive assemblies of the intercoupling arrangement may be arranged for instance within a tubular mounting 80 or any other suitable common casing.

In the following, the driving rods 71 will be illustrated on the basis of different example embodiments. According to the embodiment shown in FIG. 5a, each driving rod 71a extends between corresponding worm pinions of two adjacent coaxial double drive assemblies and each driving rod 71a is provided with a coupling element 72, which allows for adjusting the (angle) position of the intercoupled worm pinions of the coaxial double drive assemblies relative to each other and allows for adjusting the length of the driving rod 71a. For assembling/disassembling the intercoupling arrangement of the coaxial double drive assemblies, each driving rod 71a is comprised of two parts. One of the two parts or both parts of the driving rod 71a extending from the coupling element 72a can be slid into the coupling element 72a, which is provided with corresponding recess accepting the slid-in part of the driving rod 71a. When at least one of the parts of the driving rod 71a is slid into the coupling element 72, the length is shortened and the driving rod 71a can be interposed between the two adjacent coaxial double drive assemblies. By sliding out the at least one slid-in part of the driving rod 71a, the required length of the driving rod 71a is obtained and the end parts of the driving rod 71a are coupled to the worm pinions of two adjacent coaxial double drive assemblies for instance in that the worm pinions are provided with acceptances, into which the end portions of the driving rod 71a are inserted.

According to the embodiment shown in FIG. 5b, each driving rod 71b extending between corresponding worm pinions of two adjacent coaxial double drive assemblies is composed of two parts, which are substantially coupled by a coupling element 72b, wherein the two parts of the driving rod 71b substantially abut on each other. The coupling element 72b is designed to allow for adjusting the (angle) position of the intercoupled worm pinions of the coaxial double drive assemblies relative to each other. Hence, the length of the driving rod 71b cannot be adjusted. For assembling/disassembling the intercoupling arrangement of the coaxial double drive assemblies, the worm pinions are provided with through passages or lead-throughs, through which the driving rod 71b can be slid. Tongue and groove joints may be used to couple a driving rod 71b to a worm pinion, through which the driving rod 71b extends.

According to the embodiment shown in FIG. 5c, the driving rods 71c substantially correspond to those shown in FIG. 5b and described with reference thereto. But, the driving rods 71c of this embodiment, the coupling element 72c and the two parts of the driving rods 71c are coupled with the help of tongue and groove joints, in particular a feather key groove joint. This embodiment is cost effective. However, the (angle) position of the intercoupled worm pinions of the coaxial double drive assemblies relative to each other cannot be adjusted because of the predefined (angle) position of the two parts of the driving rods, which (angle) position is defined by the tongue and groove joints.

In the embodiments shown in FIG. 5a to 5c, exemplary assembling procedures for intercoupling the coaxial double drive assemblies, i.e. the worm pinions thereof with driving rods are additionally illustrated.

The coaxial double drive assemblies according to the aforementioned embodiments of the present invention are provided to drive a sunblind assembly of a secondary front of a building. In order to more fully describe this preferred use case of the coaxial double drive assemblies reference back to FIG. 2 should be made.

As also already described, the outer hollow shell element 40 may be provided with one or more slits or slit-like recesses. These one or more slits or slit-like recesses are provided along the longitudinal extent of the outer hollow shell element 40 and extend in direction of circumference. In FIG. 2, several slit-like recesses 90 within the outer hollow shell element 40 are predicted, through which mounting elements 91 such as arms are arranged, which are attached to the inner core element 41. The mounting elements 91 have further attached thereon shielding elements 95, in particular shielding elements forming a sunscreen against incident rays of sun. The outer hollow shell element 40 is likewise provided with shielding mount elements 92, having also attached thereon sun shielding elements 96. These sun shielding elements form at least a part of a second-skin facade of a building, which is arranged outside of the primary front of the building and shields the primary front. In this case, the second-skin facade inter alia includes a sunscreen formed of shielding elements 95 shielding against the incident rays of sun, means that the shielding elements 95 and 96 should be oriented with relationship to the position of the sun, i.e. the solar altitude, to shield the rays of sun, for instance to control the heating effect of direct rays of sun. In order to obtain such shielding effect, the orientation of the shielding elements 95 and 96 is controlled in accordance with the intensity of the sun and the position of the sun depending on the time of day.

New facade-concepts provide facades that actively consider the difference between outer and inner climate and that manage the inner climate together with the building installations. Not only does the demand of the designers for a transparent building-enclosure play a role in the development of these facades, but also the strongly changing energy balance in many offices and the demand of many users for an individually adjustable climate and a clear view. A notable characteristic of these facades is that they actually co-operate with the installations in a building or even integrate with them to such a level that these facades become part of the installation. Although it seems contradictory the result can be that extra installation techniques are used to be able to realize an energy friendly building that can guarantee a decent inner climate. A second-skin facade may be understood as a reversed climate facade: for instance, a ventilated air cavity between an imler sheet of insulated glass and an outer sheet of (usually hardened) single layer glass. A sunscreen may be fitted in the air cavity, for instance directly behind the outer sheet. The advantage of the second-skin facade is that the cavity can be naturally ventilated and that (inside) windows can be opened to ventilate without affecting the system too much. Another advantage of such a second-skin facade is that with tall buildings windows that can be opened by users can be applied without causing wind hindrance.

The inner core element 41 and the outer hollow shell element 40 can be pivoted independently, in the same direction of rotation or in opposite directions of rotation. Accordingly, the shielding elements 95 attached to the inner core element 41 and the shielding elements attached to the outer hollow shell element 40 can be oriented independently such that an almost optimally adapted shielding effect is obtainable.

In view of the many possible embodiments to which the principles of this invention may be applied, it should be recognized that the embodiment described herein with respect to the drawing figures is meant to be illustrative only and should not be taken as limiting the scope of invention. Therefore, the invention as described herein contemplates all such embodiments as may come within the scope of the following claims and equivalents thereof.

The invention claimed is:

1. A coaxial double drive assembly configured for actuating shielding elements of a secondary skin façade of a building, comprising
    an outer drive output and an inner drive output, which are arranged substantially coaxially with each other to an axis of rotation;
    a driving arrangement, which is adapted to accept one or more transmission gear assemblies, which connect the outer and inner drive output to one or more rotating motor drives, which axes of rotation are substantially perpendicular to the axis of rotation of the outer and inner drive outputs;
    a first gear wheel connected to the outer drive output and a second gear wheel connected to the inner drive output, wherein the first and second gear wheels pivot about the axis of rotation; and
    a first worm pinion engaging with the first gear wheel and a second worm pinion engaging with the second gear wheel,
    wherein the outer drive output and the inner drive output extend at the same side of the coaxial double drive assembly and are adapted to accept a two-part pivot assembly, which when pivoted by the outer drive output and the inner drive output, is adapted for actuating the shielding elements of the secondary skin facade coupled thereto,
    wherein the first worm pinion (20) and the second worm pinion (21) are connectable with driving rods (71, 71a, 71b, 71c), which allow for interconnecting the first worm pinions (20) of a drive interconnecting arrangement comprising two or more coaxial double drive assemblies (1) and which allow for interconnecting the second worm pinions (21) of the drive interconnecting arrangement,
    wherein the driving rods (71, 71a, 71b, 71c) respectively comprise two rod portions and a connecting element (72, 72a, 72b, 72c), which is adapted to interconnect the two rod parts of the driving rod.

2. The coaxial double drive assembly according to claim 1, further comprising:
    a ring guide, which accepts the two-part pivot assembly and which is adapted to allow the two-part pivot assembly to pivot therein,
    wherein the ring guide is detachably mounted at the opposite side with respect to the side at which the outer drive output and the inner drive output extend,
    wherein the ring guide allows set up of a string assembly of two or more coaxial double drive assemblies, wherein the two-part pivot assembly coupled to one of the coaxial double drive assemblies of the string assembly is accepted by the ring guide of the next coaxial double drive assembly of the string assembly.

3. The coaxial double drive assembly according to claim 2, wherein the surface of the coaxial double drive assembly, at which the ring guide is detachably mounted is substantially perpendicular to the axis of rotation.

4. The coaxial double drive assembly according to claim 1, wherein the two-part pivot assembly comprises an outer hollow shell element and an inner core element, wherein the outer hollow shell element comprises recesses, through which mount elements for the shielding elements are passed through from being coupled to the inner core element coaxially arranged within the outer hollow shell element.

5. The coaxial double drive assembly according to claim 1, wherein the coaxial double drive assembly is mountable to a surface by a coaxial double drive mounting, to which the coaxial double drive assembly is detachably mounted.

6. The coaxial double drive assembly according to claim 1, wherein axes of rotation of the first and second worm pinions are substantially parallel to each other and substantially perpendicular to the axis of rotation.

7. The coaxial double drive assembly according to claim 1, wherein the coaxial double drive assembly is drivable by the transmission gear assembly, which is connectable with the rotating motor drive and which engages with at least one of the first and second worm pinion, when mounted to the coaxial double drive assembly, wherein the transmission gear assembly is detachably mountable to the coaxial double drive assembly.

8. The coaxial double drive assembly according to claim 1, wherein the drive interconnecting arrangement comprises a first transmission gear assembly connectable with a first rotating motor drive, wherein the first transmission gear assembly mounted one of the coaxial double drive assemblies of the drive interconnecting arrangement interconnects the first motor drive with the first worm pinion, wherein the drive interconnecting arrangement comprises a second transmission gear assembly connectable with a second rotating motor drive, wherein the second transmission gear assembly mounted one of the coaxial double drive assemblies of the drive interconnecting arrangement interconnects the second motor drive with the second worm pinion.

9. The coaxial double drive assembly according to claim 1, wherein the connecting element is adapted to accept at least a part of at least one of the two rod portions to allow for length adaptation of the driving rod.

10. The coaxial double drive assembly according to claim 1, wherein the driving rod is slid through the first worm pinion or the second worm pinion, which is provided with a lead-through.

11. The coaxial double drive assembly according to claim 4, wherein the coaxial double drive assembly is mountable to a surface by a coaxial double drive mounting, to which the coaxial double drive assembly is detachably mounted.

12. The coaxial double drive assembly according to claim 11, wherein axes of rotation of the first and second worm pinions are substantially parallel to each other and substantially perpendicular to the axis of rotation.

13. The coaxial double drive assembly according to claim 12, wherein the coaxial double drive assembly is drivable by the transmission gear assembly, which is connectable with the rotating motor drive and which engages with at least one of the first and second worm pinion, when mounted to the coaxial double drive assembly, wherein the transmission gear assembly is detachably mountable to the coaxial double drive assembly.

14. A coaxial double drive assembly configured for actuating shielding elements of a secondary skin façade of a building, comprising an outer drive output and an inner drive output, which are arranged substantially coaxially with each other to an axis of rotation;

a driving arrangement, which is adapted to accept one or more transmission gear assemblies, which connect the outer and inner drive output to one or more rotating motor drives, which axes of rotation are substantially perpendicular to the axis of rotation of the outer and inner drive outputs;

a first gear wheel connected to the outer drive output and a second gear wheel connected to the inner drive output, wherein the first and second gear wheels pivot about the axis of rotation; and a first worm pinion engaging with the first gear wheel and a second worm pinion engaging with the second gear wheel, wherein the outer drive output and the inner drive output extend at the same side of the coaxial double drive assembly and are adapted to accept a two-part pivot assembly, which when pivoted by the outer drive output and the inner drive output, is adapted for actuating the shielding elements of the secondary skin facade coupled thereto, wherein the first worm pinion (20) and the second worm pinion (21) are connectable with driving rods (71, 71a, 71b, 71c), which allow for interconnecting the first worm pinions (20) of a drive interconnecting arrangement comprising two or more coaxial double drive assemblies (1) and which allow for interconnecting the second worm pinions (21) of the drive interconnecting arrangement, wherein the drive interconnecting arrangement comprises a first transmission gear assembly connectable with a first rotating motor drive, wherein the first transmission gear assembly mounted one of the coaxial double drive assemblies of the drive interconnecting arrangement interconnects the first motor drive with the first worm pinion, wherein the drive interconnecting arrangement comprises a second transmission gear assembly connectable with a second rotating motor drive, wherein the second transmission gear assembly mounted one of the coaxial double drive assemblies of the drive interconnecting arrangement interconnects the second motor drive with the second worm pinion.

15. The coaxial double drive assembly according to claim 8, wherein the connecting element is adapted to accept at least a part of at least one of the two rod portions to allow for length adaptation of the driving rod.

16. The coaxial double drive assembly according to claim 8, wherein the driving rod is slid through the first worm pinion or the second worm pinion, which is provided with a lead-through.

17. A coaxial double drive assembly configured for actuating shielding elements of a secondary skin façade of a building, comprising an outer drive output and an inner drive output, which are arranged substantially coaxially with each other to an axis of rotation;

a driving arrangement, which is adapted to accept one or more transmission gear assemblies, which connect the outer and inner drive output to one or more rotating motor drives, which axes of rotation are substantially perpendicular to the axis of rotation of the outer and inner drive outputs;

a first gear wheel connected to the outer drive output and a second gear wheel connected to the inner drive output, wherein the first and second gear wheels pivot about the axis of rotation; and a first worm pinion engaging with the first gear wheel and a second worm pinion engaging with the second gear wheel, wherein the outer drive output and the inner drive output extend at the same side of the coaxial double drive assembly and are adapted to accept a two-part pivot assembly, which when pivoted by the outer drive output and the inner drive output, is adapted for actuating the shielding elements of the secondary skin facade coupled thereto, wherein the first worm pinion (20) and the second worm pinion (21) are connectable with driving rods (71, 71a, 71b, 71c), which allow for interconnecting the first worm pinions (20) of a drive interconnecting arrangement comprising two or more coaxial double drive assemblies (1) and which allow for interconnecting the second worm pinions (21) of the drive interconnecting arrangement, wherein the driving rod is slid through the first worm pinion or the second worm pinion, which is provided with a lead-through.

* * * * *